(12) United States Patent
Crutchfield, Jr. et al.

(10) Patent No.: US 9,117,316 B1
(45) Date of Patent: Aug. 25, 2015

(54) SOCIAL IDENTITY MODELS FOR AUTOMATED ENTITY INTERACTIONS

(71) Applicant: Lockheed Martin Corporation, Bethesda, MD (US)

(72) Inventors: James H. Crutchfield, Jr., Oviedo, FL (US); Hien Q. Pham, Orlando, FL (US); Reginald H. Price, Orlando, FL (US); Steven J. Tourville, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 257 days.

(21) Appl. No.: 13/722,293

(22) Filed: Dec. 20, 2012

(51) Int. Cl.
*G06F 15/18* (2006.01)
*G06T 13/80* (2011.01)

(52) U.S. Cl.
CPC ...................................... *G06T 13/80* (2013.01)

(58) Field of Classification Search
None
See application file for complete search history.

(56) References Cited

U.S. PATENT DOCUMENTS

| | | | |
|---|---|---|---|
| 5,116,180 A | 5/1992 | Fung et al. | |
| 5,880,731 A | 3/1999 | Liles et al. | |
| 6,028,994 A | 2/2000 | Peng et al. | |
| 6,241,686 B1 | 6/2001 | Balkin et al. | |
| 6,419,629 B1 | 7/2002 | Balkin et al. | |
| 6,606,613 B1 | 8/2003 | Altschuler et al. | |
| 7,885,844 B1 | 2/2011 | Cohen et al. | |
| 7,908,165 B2 | 3/2011 | Wylie et al. | |
| 8,469,713 B2* | 6/2013 | Kron et al. | 434/238 |
| 2002/0017994 A1 | 2/2002 | Balkin et al. | |
| 2003/0163027 A1 | 8/2003 | Balkin et al. | |
| 2004/0221224 A1* | 11/2004 | Blattner et al. | 715/500.1 |
| 2004/0248071 A1 | 12/2004 | Bedziouk et al. | |
| 2007/0188502 A1* | 8/2007 | Bishop | 345/473 |
| 2008/0254423 A1 | 10/2008 | Cohen | |
| 2010/0030532 A1 | 2/2010 | Arora et al. | |
| 2010/0125799 A1 | 5/2010 | Roberts et al. | |
| 2010/0268287 A1 | 10/2010 | Celnik | |

OTHER PUBLICATIONS

Crutchfield et al. "Rapid Intelligent Avatar Training System Development", I/ITSEC, 2011, pp. 11.*
Huang et al. "Programmability of Intelligent Agent Avatars", Proceedings of the Autonomous Agents, 2001, pp. 6.*

* cited by examiner

*Primary Examiner* — Li-Wu Chang
(74) *Attorney, Agent, or Firm* — Carl M. Napolitano; GrayRobinson, P.A.

(57) ABSTRACT

One or more social interactive goals for an automated entity such as an avatar may be determined during a social interaction between the automated entity and a selected entity such as a human. Identity attributes of identity images from an identity model of the automated entity may be used to determine a set of behavioral actions the automated entity is to take for the determined goals. Paralanguage elements expressed for the automated entity via a user interface may be altered based on the determined set of behavioral actions. The automated entity may refer to a computer implemented automaton that simulates a human in the user interface of an interactive computing environment. By way of example, an avatar cybernetic goal seeking behavior may be implemented in accordance with an identity theory model.

8 Claims, 6 Drawing Sheets

SOCIAL IDENTITY MODELS FOR AUTOMATED ENTITY INTERACTIONS

FIELD OF INVENTION

Embodiments of the invention disclosed herein generally relate to the field of automated personalities, and more specifically, to automated entities such as avatar social interactions.

BACKGROUND

Social identity theory may explain 1) how people develop and maintain a self-identity; 2) how people develop a sense of membership and belonging in particular groups; and 3) how the mechanics of intergroup discrimination work. The social identity theory plays a role in the study of social psychology. Stated differently, a social identity theory describes how an individual's self-concept may be derived out of interaction with others. Numerous theoretical models have been developed for describing how social identity may be formed and how it may influence human behavior. By way of non-limiting example, one identity model may be based on the impingement of social structure on the self and how the resultant structure of the self-influences social behavior. Another identity model may concentrate on the interaction of the self and the social situation and how it influences behavior.

SUMMARY

An embodiment may comprise a computer system having a tangible memory device, a processor, and program instructions, stored in the tangible memory device for execution by the processor, configured to automate automated entity behavior to emulate social human behavior according to an interactive social identity image model (SIIM) to exhibit goal seeking behavior from the automated entity during a social interaction between the automated entity and a selected entity. A data store may provide the interactive social identity image model (SIIM) for the automated entity, wherein the interactive SIIM may comprise a plurality of social identity images, each social identity image may comprise a plurality of social identity image attributes (SIIAs), and wherein at least one value of the plurality of SIIAs may change with each behavior of the automated entity and with each behavior of an entity during the social interaction between the automated entity and the selected entity. The automated entity may comprise an avatar and the selected entity may comprise a human, by way of example.

In an alternate embodiment, a computer system may comprise a processor, means for determining one or more social interactive goals (SIGs) for an automated entity during a social interaction between the automated entity and an entity based on a social identity target state and a perceived identity state, and means for determining a set of behavioral actions for the automated entity based on the determined one or more SIGs and an interaction strategy. A user interface may be provided for altering paralanguage elements expressed for the automated entity based on the determined set of behavioral actions, wherein the automated entity emulates social human behaviors. The paralanguage elements may comprise a facial expression, a gesture, body language, or combinations thereof for the automated entity.

A computer-implemented aspect may comprise a processor determining one or more social interactive goals (SIGs) for an automated entity during a social interaction between the automated entity and a selected entity based on a social identity target state and a perceived identity state, determining a set of behavioral actions for the automated entity based on the determined one or more SIGs and an interaction strategy, and may alter paralanguage elements expressed for the automated entity via a user interface based on the determined set of behavioral actions, wherein the automated entity emulates social human behaviors.

BRIEF DESCRIPTION OF DRAWINGS

Embodiments are described by way of example with reference to the accompanying drawings in which.

DETAILED DESCRIPTION OF EMBODIMENTS

Figure 1A:
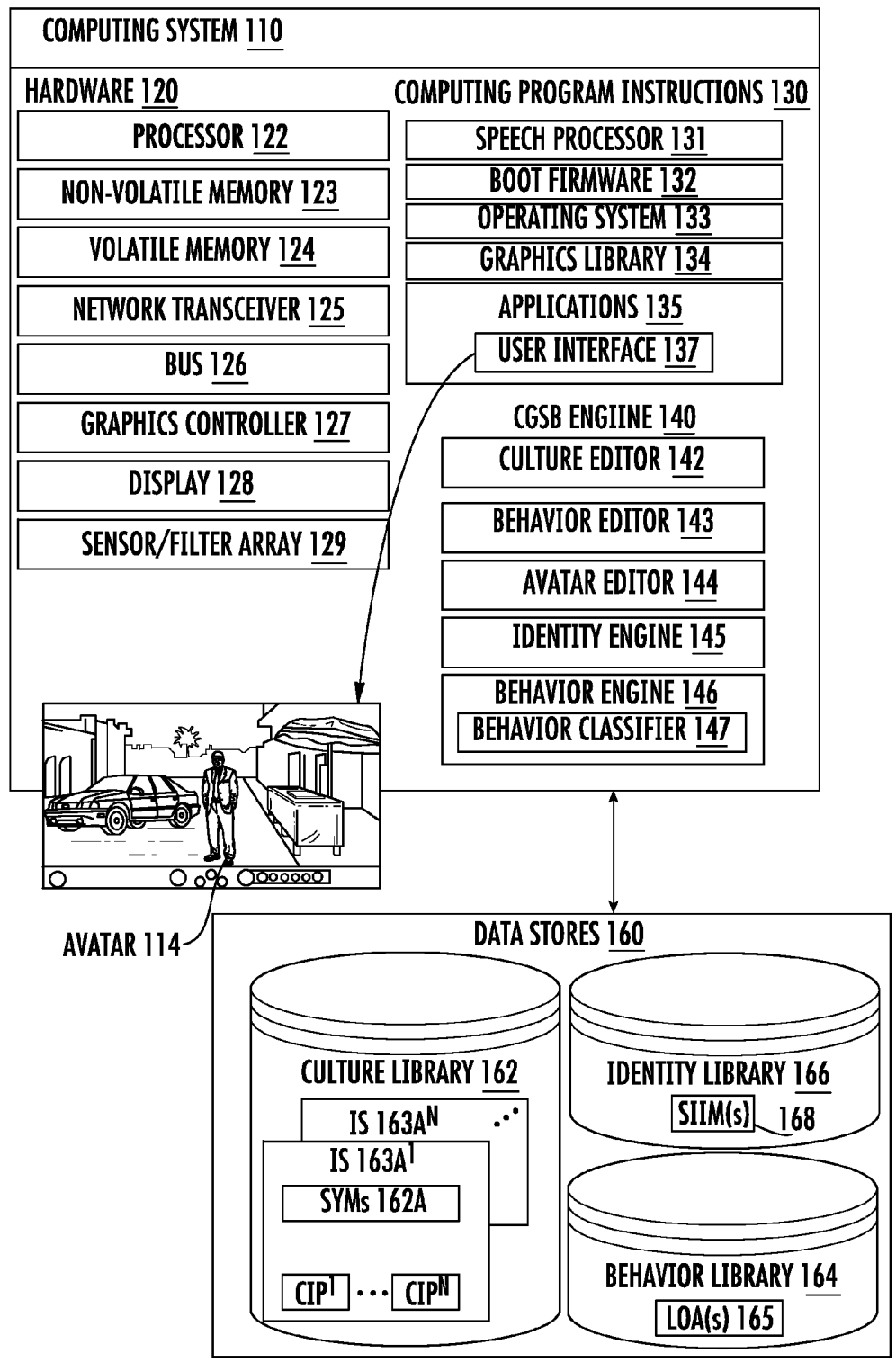
FIG. 1A is a diagrammatical illustration of one computing system for controlling automated avatar social interactions using social identity image models (SIIMs) in accordance with certain embodiments.

The present invention will now be described more fully hereinafter with reference to the accompanying drawings, in which embodiments are shown by way of illustration and example. While the invention may be embodied in many forms, the embodiments herein described by way of example should not be construed to be limiting as set forth herein. Rather, these embodiments are provided so that this disclosure will be thorough and complete, and will fully convey the scope of the invention to those skilled in the art. Like numerals refer to like elements.

While some terms and acronyms used in the art may be used in describing certain embodiments, it will be useful to describe known and new terms herein employed to clearly describe certain embodiments. The following descriptions are presented by way of example.

Social identity image attributes (SIIA)—A collection of descriptive attributes, such as by way of non-limiting example, feelings, with values that represents the identity state of an entity, whether human or artificial.

Reflexive target social identity image (RTSII)—The SIIA and related values that describe the target identity state of an automated entity such as an avatar itself as it would like another to ascribed it, whether human or artificial.

Reflexive social identity image (RSII)—The SIIA and related values that describe the "present" or perceived identity state of an automated entity such as an avatar itself as it believes another has ascribed it, whether human or artificial.

Actual social identity image (ASH)—The SIIA and related values that represents the "present" or perceived identity state of an entity, whether human or artificial.

Target social identity image (TSII) of others—The SIIA and related assigned values that represent the social identity target state of an entity (others), whether human or artificial.

Social identity image model (SIIM)—An interactive model configured to emulate human behavior through the use of social identity images attributes (SIIA) and social identity negotiation (SIN) driven by an interaction strategy (IS) that implements a cybernetic goal seeking behavior to attain a social interaction goal (SIG). The SIIM includes a set of social identity images used by an interaction strategy (IS) to select lines of action (LOA).

Cybernetic goal seeking behavior (CGSB) Engine—The automated selection and expression of behaviors to obtain and/or maintain a social identity target state by comparing a "present" or perceived identity state with a social identity target state and using a target differential of the comparison to select and display specific behaviors that will cause changes in the "present" or perceived state that may result in minimizing the actual differences (e.g., target differential) from the social identity target state.

Cultural Interaction protocol (CIP)—A set of culturally defined behaviors exchanged at specific points in an interaction. Non-limiting examples may include behavior expressions of greetings, decision agreements, and departures. The behavior may be expressed with little variation due to context other than time and sequence appropriateness.

Interaction strategy (IS)—The decision logic, goals and rules used to select a behavior in order to attain a target social identity image. The IS may include different importance measures in the form of different numerical "weights" applied to attributes of social identity image attributes (SIIA). The IS may also include different numerical weights applied to a line of action (LOA) increasing the likelihood they may be selected for expression.

Interactive computing environment (ICE)—A computing system that may control automated avatar social interactions using a social identity image model (SIIM) in accordance with embodiments. The avatar's expressions and behavior may be presented in an audio and visual format that may be offered on any of a number of display systems. The display systems may range from small hand-held devices to larger than life-size, three-dimensional display devices. The ICE may include a system or array of filters and sensors, the sensors may include keyboards, microphones, motion sensors, proximity sensors, touch sensors, heat sensors, weapons sensors, odor sensors, etc. to detect inputs from the human and other environmental elements with which it may be interacting. The ICE may also include systems to detect inputs from other virtually realized entities such as other avatars. In addition to avatars, the ICE also manages other entities and objects in the virtual environment.

Line of action (LOA)—A collection of language and paralanguage behaviors which express a behavior or single act in a social interaction. A non-limiting example of a greeting line of action may include a smile, nodding, extending the hand for handshake and speaking "Good morning, how are you." The LOA may include one or more of a facial expression, paralanguage, language, body language, posture, speech affectations, gestures, emotions, social actions and phrases.

Social identity negotiation (SIN)—The turn-taking exchange of behaviors between actors, whether real or avatar, where both actors may be expressing cybernetic goal seeking behavior to attain their own social interaction goals (SIGs).

Social interaction goal (SIG)—To minimize a target differential between the SIIA values of the RTSII and RSII and also between the TSII and ASII. An actor's goal is to achieve a minimum target differential between target social identity images, for the self, and for each of the other actors engaged in the interaction and perceived or actual social identity images, for the self and for each of the other actors engaged in the other interaction. Every actor in a social situation has their own version of the social interaction goal (SIG).

In an embodiment, a computing system may be configured to apply the science of identity theory to simulated entities (e.g. avatars) in a simulated environment that accurately imitates human identity goal seeking behavior. The computing system may include a behavior library database and configured to select behavior from the behavior library database to create an automated entity such as the avatar that emulates a selected entity behavior such as human behavior as it engages in interaction with other entities, including humans. While not intended to be a limitation, the automated entity herein described by way of example will be the avatar and one selected entity will be the human.

In an embodiment, a computing system may be configured to interpret and produce statements and expressions, body language, and other paralanguage elements, summarized as lines of action (LOA) during social interactions involving at least one automated entity (e.g., an avatar) in a simulation environment. The computing system collects and stores LOAs, and selects and employs the LOA in simulated human interaction. By way of non-limiting example, the computing system provides a mechanism in which a human may interact with an automated (simulated) entity or avatar, which socially reacts to the human's speech, human's facial expressions, human's body language, and the like. These reactions may include expressing language or exhibiting facial expressions, body language, and the like, all of which represent behavior. The computing system may be configured to enable automated entities or avatars to interact with each other or with humans in a simulated environment to determine, interpret, and responsively express both language and paralanguage elements (e.g., facial expressions, body language, etc.) whereby the language and paralanguage elements may be stored in the LOA.

In an embodiment, automated avatar intelligence may be implemented in accordance with a simulated interactive SIIM that may be in compliance with an identity theory and exhibits cybernetic goal seeking behavior (CGSB). The avatar may refer to a non-human persona that simulates a human in the user interface of an ICE (e.g., simulation environment). In one embodiment, the avatar, as used herein, may be considered an automated entity. The automated entity may be one created, controlled, and maintained by program instructions executing on one or more processor.

In one embodiment, expressed behaviors, used in the SIN, may comprise either or both of language and paralanguage elements. The expression of a behavior, by a human or an avatar, may cause changes in the SIIA of everyone else in the social setting.

In one embodiment, avatars in a social setting may have their own versions of the SIIAs, describing everyone in the setting.

In one embodiment, avatars in a social setting may have their own versions of the TSII for everyone in the setting. The avatar engages in SIN by choosing behaviors that produce changes in the SIIA of the RSII in the SIIM, mathematically moving these SIIA values toward their respective values of SIIAs for TSII and RTSII.

In one embodiment, avatars may maintain a SIIM that may include the SIIA of the TSII for everyone in the interaction setting.

In one embodiment, the computing system may include a list of the LOA expected to be expressed by the avatar or by a user and the changes in SIIA these LOA will create.

In one embodiment, an interaction event may be detected for the avatar and an entity. The interaction event may be compared to the database of LOA and the closest match may be determined. The changes in SIIM associated with the LOA may be applied against all ASII maintained by the avatar in its SIIM, updating all its ASII for the others and the reflexive social identity image (RSII) for itself. The resulting ASII and RSII may be compared with the SIG, RTSII and TSII for the avatar and others respectively to identify the differences. Thus, at least one social interaction goal (SIG) may be determined for the avatar, which may be to reduce this difference to zero. An interaction strategy (IS) for the avatar to achieve the at least one SIG may be determined. A set of one or more LOA to be taken in accordance with the strategy may be determined. The avatar may perform the selected LOA during a social interaction within a user interface of the ICE. The avatar may interpret an expression of its own LOA to modify its SIIM, including, but not limited to, the ASII for the others and the RSII for itself.

Illustrations and non-limiting examples presented herein focus on a training application for socially interactive avatars. The illustrations and non-limiting examples should not be construed as limited in this regard, and avatar intelligence and avatar behavior may be applicable in a myriad of applications, which may include virtualized worlds, augmented reality applications, simulations, entertainment, cinematography, and the like. Training applications may be used as an illustration, since conventionally they have been beyond the ability of computer systems to effectively and efficiently implement, which may be a shortcoming believed to be overcome.

Thus, embodiments may be configured to emulate a cultural training avatar. Such an embodiment may provide cultural training without the need for an extensive behavior tree (BT) network of behaviors and responses. Further, the system detailed herein may be adaptable across cultures and across training situations.

Figure 1B:
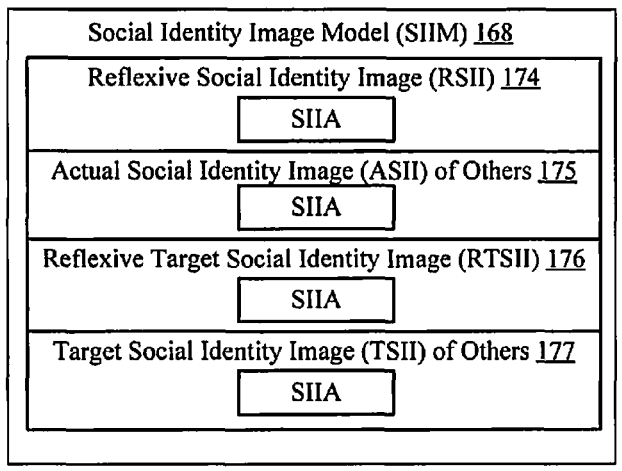
FIG. 1B is a block diagram of a social identity image model (SIIM) in accordance with certain embodiments.

With reference to FIG. 1A, one embodiment is herein described by way of example as a computing system 110 for controlling avatar social interactions of one or more avatars 114 using SIIMs 168, illustrated with reference to FIG. 1B. The computer system 110, herein described by way of non-limiting example, includes hardware 120 and includes computer program instructions 130 that together permit the one or more avatars 114 to be presented within a user interface 137. Each avatar 114 may use a SIIM 168 for social interactions. That is, program instructions for the avatar 114 may be configured to interpret social cues of an entity with which the avatar interacts. These cues may be configured to drive the avatar's behavior. Specifically, the SIIM 168 may be used to determine the SIG for the avatar 114. Cybernetic goal seeking behavior (CGSB) engine 140 may be configured to convert the SIG into a series of LOAs 165 for the avatar 114, as illustrated with reference to FIG. 1D. The set of lines of actions LOAs 165 may include speech but may be configured to adjust paralanguage properties or behaviors of the avatar 114, such as, without limitation, facial expressions, body language, posture, speech affectations, etc. stored in a behavior library 164. Additionally, cultural influences may be defined which affect social behavior and culture interactive protocols (CIP) observed by the avatar 114. The avatar social behavior and interaction of avatar 114 dynamically changes based on sensed or perceived feedback from the entity with which the avatar 114 interacts. This feedback may include paralanguage communications of the entity, as well as grammar-based communications and/or actions of the entity.

As used herein, the avatar 114 refers to a non-human persona that simulates a human in an interactive computing environment (ICE). A human may be able to socially interact with this avatar 114, as if the avatar 114 were another human or living entity capable of cognition. The avatar's behavior may be controlled by computer program instructions 130. The avatar 114 may emulate cognitive functions and behavioral interactions of a human. The avatar 114 may be expressed within a user interface 137 as an electronic image. The avatar 114 may take on human form and may have avatar specific attributes, such as appearance, personality, dialect, knowledge, abilities, and the like. Each avatar 114 may be controlled by its own SIIM 168. Avatars 114, as used herein, are not limited to human form, and may include animals, animated objects, such as humanized inanimate objects that are, by way of non-limiting example, included in animated movies. At least one SIIM 168 may be saved for avatar 114 for subsequent recall restarting an interaction strategy with an entity previously engaged. The identify library 166 may store the last state of the SIIM 168 for each interaction with different entities. Furthermore, the SIIMs 168 for multiple avatars and entities may be stored.

Paralanguage may refer to non-verbal elements of communication used to modify meaning and to convey emotion. Paralanguage may include, but not limited to, vocally-produced sounds as well as non-acoustic communications. Non-acoustic communications may include, but not limited to, body language, facial expressions, gestures, and the like. Acoustic paralanguage elements may include, but not limited to, speech affectations, such as pitch, volume, and intonation. In one embodiment, paralanguage expressions are used during social interactions as grammatically expressed content (e.g., use of normal language or grammatically expressed communications).

With reference again to FIG. 1A, the computing system 110 represents one possible system for carrying out the steps of method 200. The computing system 110 may include one or more computing devices. The computing devices may be general purpose computing devices, such as personal computers, servers, in-vehicle computers, and the like. In various embodiments, computing device(s) may be implemented as stand-alone devices, as virtual devices, as distributed devices, as cooperative devices, and the like.

The hardware 120 comprises at least one processor 122, a non-volatile memory 123, a volatile memory 124, a network transceiver 125, a bus 126, a graphics controller 127, a display 128, a sensory/filter array 129 (e.g., cameras, microphones, keyboards, mouse, biometric sensors, filters etc.), a set of data stores 160, and/or other such components.

The computer program instructions 130 may include applications 135 providing a user interface 137 for displaying one or more avatars 114. Computer program instructions 130 may also include a CGSB engine 140 containing a culture editor 142, a behavior editor 143, an avatar editor 144, an identity engine 145, and/or a behavior engine 146. The behavior engine 146 includes a behavior classifier 147.

The computer program instructions 130 may also include speech processor 131, boot firmware 132, operating system code 133, a graphics library 134, a set of applications 135 running on the computing system 110.

The data stores 160 may include a culture library 162, a behavior library 164, and an identity library 166. The identity library 166 may include data, such as the SIIM 168, which provides attributes of the SIIA 180, as illustrated with reference to FIG. 1C, used by the identity engine 145. In one embodiment (and as expressed by FIG. 1B), each SIIM 168 may contain a set of social identity images (e.g., RSII, ASII, RTSII and TSII) where each social identity image includes a SIIA. Identity engine 145 may include programmatic code designed to permit the avatar 114 to emulate a sense of human identity, which may be applied (using functions of behavior engine) to permit the avatar 114 to engage in social interactions in a manner that emulates human social interactions in accordance with details expressed herein.

The culture library 162 includes a plurality of interaction strategies (IS) $163A^1 \ldots 163A^N$ where N is greater than one.

The set of rules used to assign values to attributes of the SIIA 180 and select behavior, by the behavior engine 146, may be called an interaction strategy (IS), such as without limitation, the "norm of reciprocity". A non-limiting example of the "norm of reciprocity" may include if someone gives a person something, said person owes something in return. The power of the "norm of reciprocity" has impact on a SIIM which may both manipulate, and be manipulated by it.

Another non-limiting example of an IS and its impact on a SIIM may be drawn from a social distance theory. In one embodiment, the social distance theory may include how entities understand socially defined groups, or entities defined as belonging to some classification. The social distance theory may be explained as a set of socially shared symbols (SYM) 162A, and may be assigned to entities of these classifications. The set of socially shared symbols (SYM) 162A may be used to create expected behaviors from entities that come from different regions of the country. People and avatars 114, via the identity engine 145 and behavior engine 146, may construct personal strategies to deal with entities from these different regions in accordance with symbols established in the identity library 166. The set of socially shared symbols (SYM) 162A specific to groups of entities may be quantified within data of the culture library 162.

Another non-limiting example of an IS may include Role theory, wherein in Role theory behavior may be explained by the roles entities perform. In an embodiment, a IS configured for Role theory behavior may be configured to resolve as an application of identity theory whereby roles represent symbolic collections that define the role behaviors and attitudes. Social norms associated with roles may share rules about the behaviors associated with roles which may be collected into behavior sets, and stored within data of behavior library 164.

Related to Role theory are the protocols that define sequences of behavior for each culture. For each culture, there is a cultural interaction protocol (CIP). Therefore, each IS may include one or more embedded CIPs $CIP^1 \ldots CIP^N$ where N is a number greater than one. Each CIP may be configured as a set of culturally defined behaviors exchanged at specific time points in an interaction strategy. Non-limiting examples may include greetings, decision agreements, and departures. Each CIP may typically be expressed with little variation due to context other than time and sequence appropriateness.

People/avatar/entities may use a different IS under different conditions. Consequently, higher avatar fidelity may be implemented through multiple ISs. Additionally, an IS in use by people/avatar/entities at any point in an interaction of an IS may change. In one embodiment, the avatars 114 and other entities choose an interaction based on what worked in the past, socio-structural constraints, such as power differences in an interaction, and what they want to get out of the interaction strategy.

By way of non-limiting example, the IS/CIP may include one or more of a greeting strategy, departure strategy, strategy for exchanging reciprocity, role theory strategy, social distance theory strategy, elder compliance exchange strategy, child compliance exchange strategy, purchasing strategy, work life strategy, family life strategy, religious life strategy, academic life strategy, military exchange strategy, governmental dignitary exchange strategy, play exchange strategy, and sports exchange strategy.

With reference again to FIG. 1B and the SIIM 168, simplification assumptions may be made to minimize the images of the SIIM 168 images that may need to be tracked. In one embodiment, the SIIM 168 may be reduced to a plurality of internal social identity images. In one embodiment, there may be four internal social identity images. The plurality of internal social identity images may include: 1) a perceived RSII 174 that the avatar may believe an entity has of the avatar 114; 2) an ASII 175 of another entity or others, which may be the entity with which an avatar 114 interacts; 3) a RTSII 176 that the avatar may have of itself; and 4) an TSII 177 of another entity or others, which may be the target image of what the avatar "wants" the other entity to become. The RSII 174 may be reflexive and configured as the perception representing how the avatar 114 believes the entity views the avatar 114. In this way, the avatar 114 may use other entities as a looking-glass or mirror through which it "understands" its social self.

Each of the internal social identity images of the SIIM 168 may include a social identity image attributes (SIIA) 180. Each attribute in the SIIA 180 may be assigned a value. Further, weights may be assigned to the attributes of the SIIA 180 to bias the importance of one or more of the attributes relative to another. The weights may be situationally applied and may vary based on defined behavioral interaction strategies.

Figure 1C:
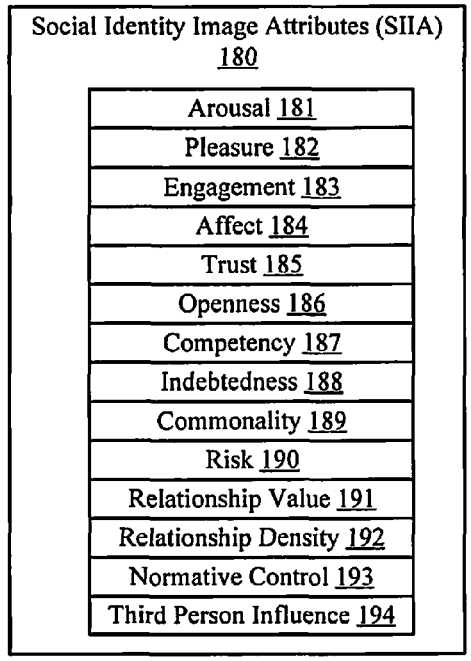
FIG. 1C is a block diagram of a social identity image attributes (SIIA) in accordance with certain embodiments.

As above described, FIG. 1C diagrammatically illustrates one embodiment of a social identity image attributes (SIIA). The SIIA 180 may describe an entity in a specific relationship at a single point in time. The SIIA 180 may change as a social interaction proceeds. The attributes of a SIIA 180 will now be described by way of non-limiting example, wherein the attribute arousal 181 may be used to control the degree of physical reaction to the interaction at a given point in time. The attribute pleasure 182 may be used to control the enjoyment or lack of enjoyment in the experience. By way of a non-limiting example, a high value of arousal 181 and a low value of pleasure 182 may be used to exemplify attributes of an angry identity image.

The attribute engagement 183 may be used to control how attentive the entity appears to be to the interaction. The attribute affect 184 may be used to describe various levels of liking or disliking. Together the values or weights of these two attributes (e.g., engagement 183 and affect 184) may be controlled to express a specific emotion. By way of non-limiting example, a high value of engagement 183 and a low value of affect 184 may also be representative of attributes of an angry identity image.

The attribute trust 185 may be used to control the sense of predictability expected from each other. The attribute openness 186 may be used to control a willingness to share. By way of a non-limiting example, both a low value of trust 185 and a low value of openness 186 may be representative of attributes of an angry identity image.

The attribute competency 187 may be used to control relative expected capability with regard to some aspect of the interaction. The attributes indebtedness 188 and commonality 189 may be relative values. The attribute risk 190 may be used to control the sense of potential loss from the interaction. By way of a non-limiting example, a high value of competency 187, imbalanced indebtedness 188, a low value of commonality 189 and a high value of risk 190 may be representative of attributes of an angry identity image.

The attribute relationship value 191 may be used to control the degree of importance associated with continued and future interactions with the other. The attribute relationship density 192 may be used to control the numbers and variation in relationship roles. The attribute normative control 193 may be used to control the degree to which behavior may be socio-structurally constrained. The attribute third person influence 194 may be used to control a level of localized behavioral constraint. By way of a non-limiting example, the attributes relationship value 191 and relationship density 192 combined with normative control 193 and third person influence 194 may be controlled to mitigate the performance of the angry identity or even comprise the characteristics of a righteous indignation to justify and stabilize the angry identity image.

The attribute competency 187 may be used to indicate or control relative expected capability with regard to some aspect of the interaction. Entities with low competency may not be allowed opportunities to perform when the risk of failure is high, for fear of loss.

The attribute of indebtedness 188 is a measure of the sense that one of the two or more entities in an interaction owes something to the other. It may indicate a relative level of balance or imbalance in an exchange relationship where information or objects which have perceived value are exchanged. A high sense of indebtedness may indicate an imbalanced relationship. Imbalanced relationships are uncomfortable and participants may seek to rebalance the relationship or leave the interaction to ameliorate the discomfort.

The attribute of commonality 189 may indicate the degree to which entities engaged in an interaction are perceived to be similar along some socially important dimension. Sharing religious belief or political opinion often indicates a high degree of commonality. On the other hand, differences in geographical or economic background may indicate a low level of commonality. This perceptual dimension is relative and situational because even individuals with many common elements such as economic and religious background may perceive a low level of commonality in the presence of some other single perceived difference. A low commonality measure can make it more difficult to reach agreement on other, unrelated matters and may cause the interaction to be shortened and closed prematurely. Entities experiencing the perception of low commonality are often uncomfortable and may desire to leave the interaction at the earliest opportunity.

The attribute risk 190 may be used to control the sense of potential loss from the interaction. Entities with a high value of risk may want to exit the interaction and not offer objects or information of value for fear of the costs, whatever they may be, of doing so.

Taken together, and by way of a non-limiting example, a high value of competency 187, high indebtedness 188, a low value of commonality 189 and a high value of risk 190 may be representative of attributes of an angry identity image. Tables 1 and 2 provide various attribute values for different expressions. The expressions may include anger, agreeable, resentment admiration, puzzlement, servitude, superiority, and compliance. The values include high, low, and not applicable (N/A).

TABLE 1

Attribute values for expressions of Anger, Agreeable, Resentment and Admiration

| Attributes | Anger | Agreeable | Resentment | Admiration |
|---|---|---|---|---|
| Arousal | High | High | High | High |
| Pleasure | Low | High | Low | High |
| Engagement | High | High | High | High |
| Affect | Low | High | Low | High |
| Trust | Low | High | Low | High |
| Openness | Low | High | Low | High |
| Competency | High | Low | High | Low |
| Indebtedness | High (Imbalanced) | High | High | Low |
| Commonality | Low | High | Low | High |
| Risk | High | Low | High | Low |
| Relationship Value | N/A | High | Low | High |
| Relationship Density | N/A | High | Neutral | Low |
| Normative Control | N/A | High | High | N/A |
| Third Person Influence | N/A | High | High | N/A |

TABLE 2

Attributes values for expressions of Puzzlement, Servitude, Superiority and Compliance.

| Attributes | Puzzlement | Servitude | Superiority | Compliance |
|---|---|---|---|---|
| Arousal | High | Low | High | Low |
| Pleasure | Low | Low | High | Low |
| Engagement | Low | Low | High | High |
| Affect | Low | Low | Low | Low |
| Trust | Low | Low | Low | High |
| Openness | Low | Low | Low | Low |
| Competency | Low | High | High | High |
| Indebtedness | N/A | High | Low | High |
| Commonality | Low | Low | Low | Low |
| Risk | Low | N/A | Low | High |
| Relationship Value | High | High | Low | High |
| Relationship Density | N/A | N/A | Low | Low |
| Normative Control | Low | High | Low | High |
| Third Person Influence | Low | High | Low | High |

Figure 1D:
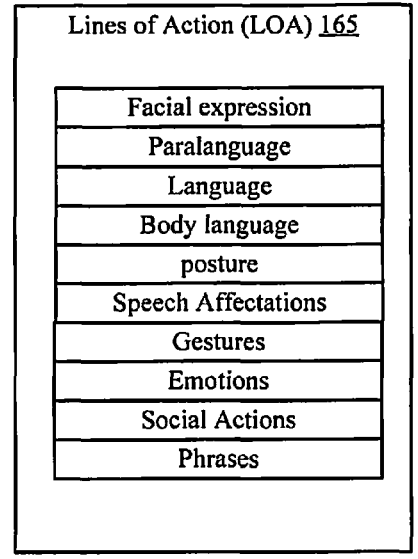
FIG. 1D is a block diagram of Lines of Actions (LOAs) in accordance with certain embodiments.

As above described, FIG. 1D illustrates Lines of Actions (LOAs) 165 in block diagram form. The LOA 165 includes one or more of a facial expression, paralanguage, language, body language, posture, speech affectations, gestures, emotions, social actions and phrases. During execution, one or more LOAs may be employed to achieve the desired behavior.

Figure 2:
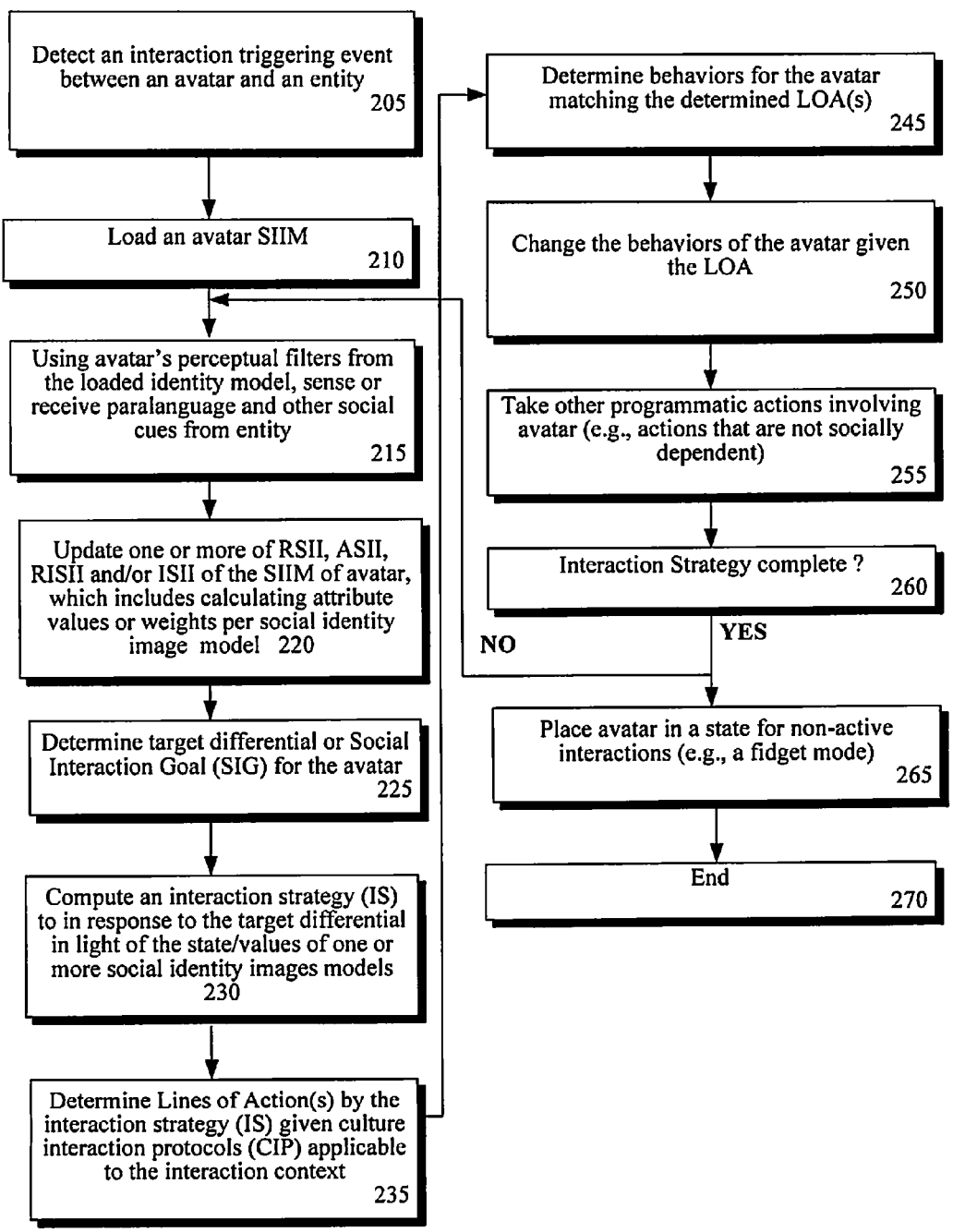
FIG. 2 is a flowchart of one method for automating avatar social interactions in accordance with certain embodiments.

With reference now to FIG. 2, one method 200 for automating avatar social interactions in accordance with embodiments of the invention is provided by way of example. The method 200 begins in step 205, where an interaction triggering event between an avatar and an entity may be detected. The entity interacting with the avatar may include one of a human, a human controlled entity, a machine-controlled entity (with or without machine implemented cognitive functions), an entity controlled by a group of humans, or an entity controlled by both machine-implemented cognitive functions and human choices.

A non-limiting example of an interaction triggering event may include a human initiating a two-way communication with an avatar. In a three dimensional computing space, where the avatar has a fixed position, the interaction event may be triggered by an interactive entity approaching the avatar within a threshold distance in accordance with one embodiment.

An SIIM 168 for the avatar may be loaded into memory in step 210. In step 215, avatar specific perceptual filters in the sensor/filter array 129 may be used to sense or receive paralanguage and other social cues from the entity, with which the avatar may interact. One or more of the social identity images of the SIIM 168 may be updated, as shown by step 220. Updating each social identity image (e.g., RSII, ASII, RTSII and TSII) may include calculating values or weights of the attribute in the SIIA 180 per social identity image. A target differential, as illustrated with reference to FIG. 3, for the avatar may be determined in step 225.

In step 230, the system 110 may be configured to compute an interaction strategy (IS) in response to the target differential or SIG in light of the state/values of the SIIA 180 for each social identity image. In step 235, a set of one or more LOAs may be determined and/or combined by the interaction strategy (IS) for given interaction protocol applicable to the interaction content. These LOA 165, described earlier with reference to FIG. 1D, may be influenced by cultural interaction protocols (CIPs) applicable to the interactive context. The CIPs may vary based on cultural factors.

In step 245, behaviors of the avatar may be determined, which match the LOAs to be taken. The behavior library 164, described earlier with reference to FIG. 1A, may include paralanguage elements for each culture. In step 250, the behaviors of the LOAs (gestures, facial expressions, body language, speech affectations, and the like) may be changed for the avatar. In one embodiment, the change may be based on the determined paralanguage elements. In step 255, other programmatic actions involving the avatar may be taken. These actions may be ones that are not socially dependent, and may be not necessarily dependent on the SIIM 168. If the social interaction strategy (IS) is not complete, the method may proceed from step 260 to step 215, as illustrated with continued reference to FIG. 2. There, the avatar may gather feedback from the entity with which it interacts. This feedback may cause the avatar to dynamically adjust its social interaction strategies (IS), behavioral actions, and/or paralanguage elements.

When the social interaction is complete in step 260, the avatar may be optionally placed in a state for non-active interactions, as shown by step 265. By way of non-limiting example, the avatar may be placed in a fidget mode, where relatively rudimentary actions (from a behavioral perspective) may be performed. The method may end in step 270.

It should be understood that although the method 200 may be for a two-entity social interaction, social interactions of three or more entities may be handled by the SIIM model and techniques expressed herein.

To elaborate and with reference again to FIG. 3, data flow in a CGSB engine 140 are illustrated by way of non-limiting example, wherein agents (entities exhibiting social interactions consistent with identity theory, which may include the avatar 114 as detailed herein) select behaviors, or LOA 165 that the avatar 114 expresses. The act selection function 310, f( ), of the agent may be described by equation (1)

$$f:P^* \rightarrow A \qquad \text{Eq. (1)}$$

Where f is a cybernetic goal seeking behavior, P* is a sequence of preceding perceptual experiences and A is the LOA 165 that is generated as a result. The realization of the act selection function 310 may vary from simple deterministic cause and effect to more complex functions that arise as a result of the causal interactions of the perceptual experience.

The CGSB engine 140 may be configured to use multiple competing goal based agent models to produce intelligence for an avatar 114 that appears, at least within a limited domain, to use its experience to generate speech, gestures, expressions, and/or other paralanguage elements.

The act selection function may comprise a plurality of central components. The plurality of central components may include (1) behavior classifier 167 that interprets and identifies inputs as behaviors and adjusts the ASII and RSII as perceived identity states 322 accordingly; (2) a social identity target state 320, which may include the attribute values of TSII and RTSII; (3) perceived identity states 322 of attribute values of situationally based actual images (e.g., ASII and RSII); (4) a comparator 324 or mechanism that relates those situational meanings to those of the social identity target state 320; and (5) a behavior engine 146 may be configured to select one or more LOAs in the behavior Library 164 to emit or output an individual behavior 326 (*P) or activity which emerges as a function of the difference (target differential) between perception or perceived identity state 322 and the social identity target state 320. In an embodiment, the two or more LOAs may be combined for an overall behavior expression. The two or more LOAs may be combined to derive an overall behavior expression. The identify engine 145 may include or express the social identity target state 320, comparator 324 and perceived identity state 322. The identity library 166 includes the SIIM.

The behavior engine 146 may access the culture library 162 for the interaction strategy (IS). The IS may include at least one cultural interaction protocol (CIP) and/or symbol.

Figure 3:
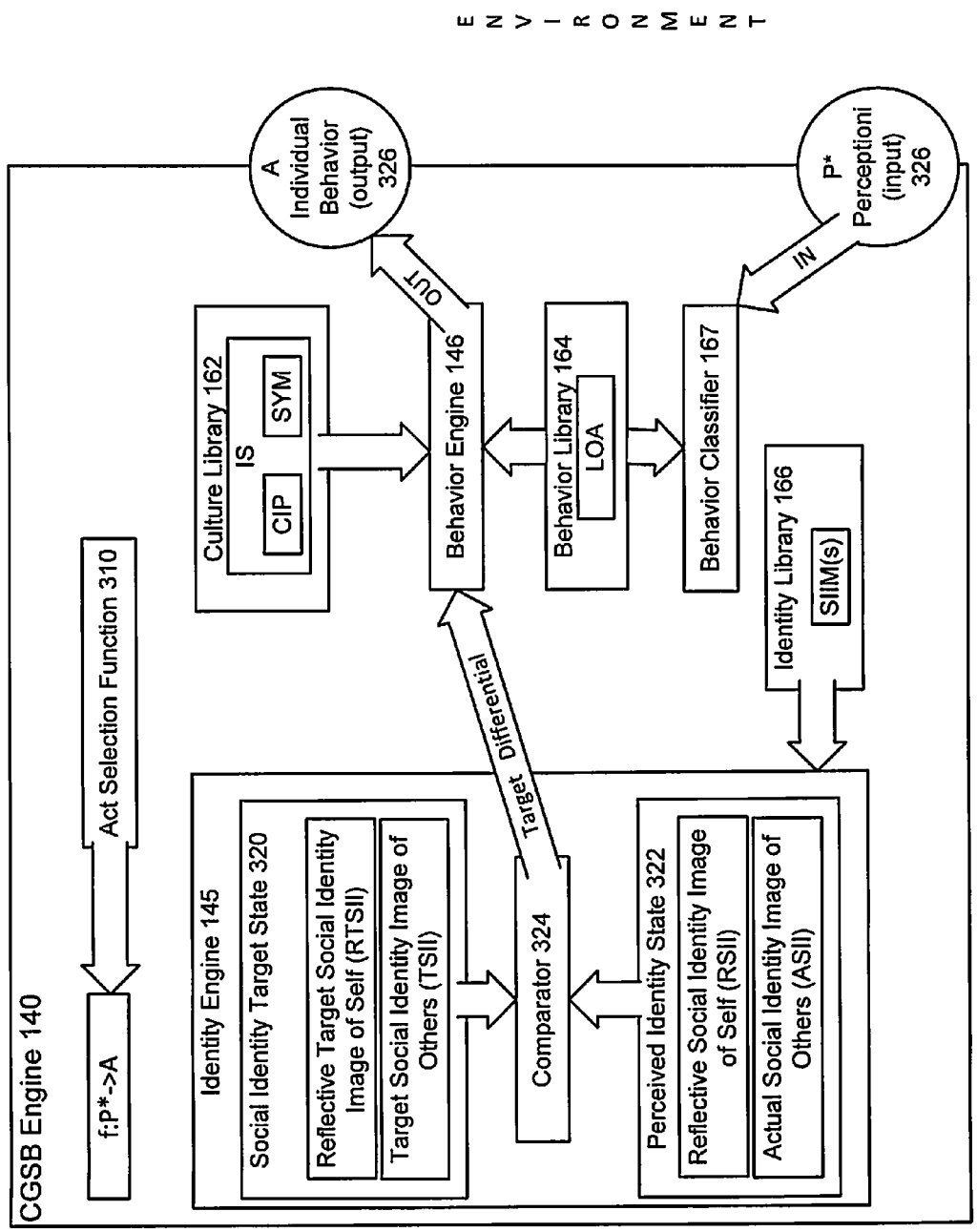
FIG. 3 is a diagrammatical illustration of data flow in a CGSB engine in accordance with certain embodiments.

Behavior, by CGSB engine 140 illustrated with continued reference to FIG. 3, may be organized to emit or output behaviors that change the situation and hence the perceived self-relevant meanings in order to bring the behaviors into agreement with those in the social identity target state 320. The SIIM expressed in FIG. 3 (as well as other identity models) may include a sufficient definition for realization as the intelligence for avatar automation, as detailed herein.

Figure 4A:
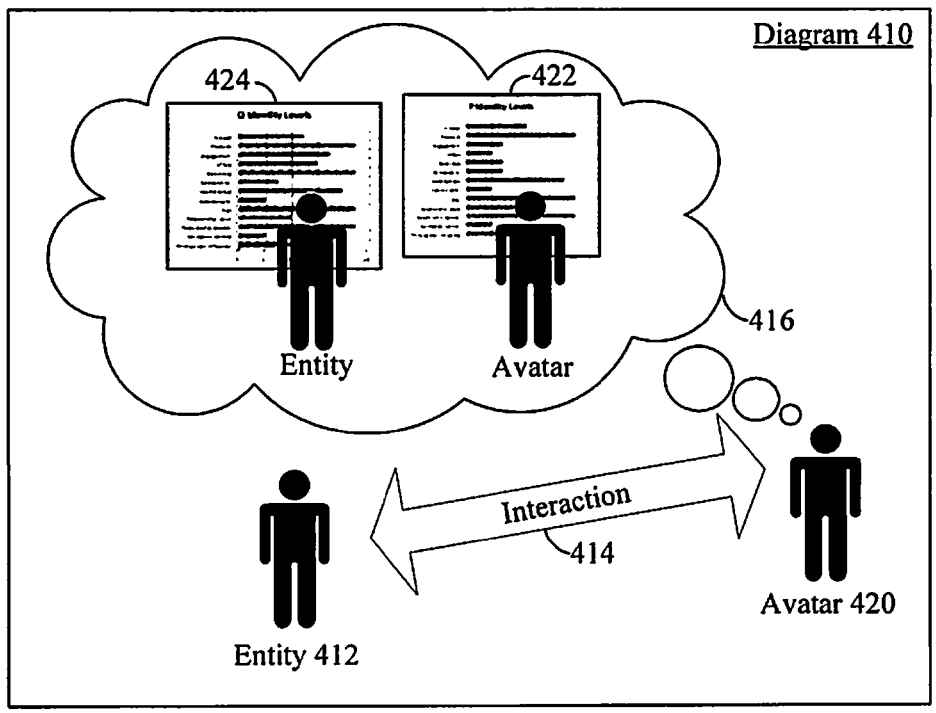
FIGS. 4A and 4B illustrate avatar interactions with another entity and with another avatar in accordance with an embodiment.
Figure 4B:
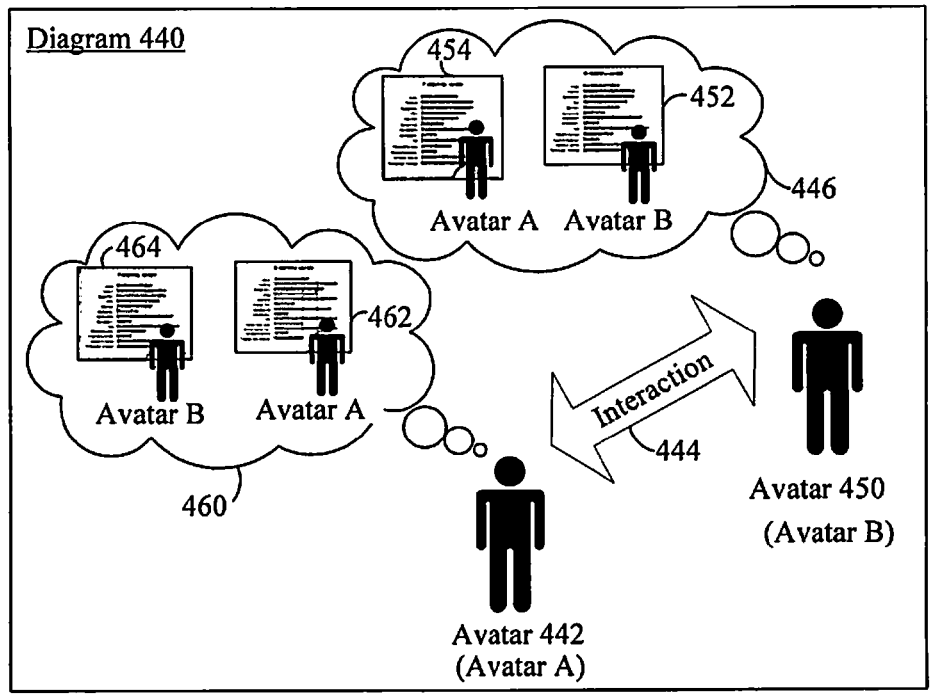

Every behavior may be classified into how it will affect each of the attribute of the SIIA 180 in both the avatar and the entity the avatar interacts with, graphically illustrated with reference to FIGS. 4A and 4B. Specifically, diagram 410 in FIG. 4A illustrates an interaction 414 between an avatar 420 and an entity 412 (which may be a person, avatar, machine-controlled entity, etc.). Grammar, actions, and paralanguage elements may be expressed during the interaction 414. A perceived identity state 416 of the avatar 420 controls behavior of the avatar 420 during the interaction 414. Specifically, the avatar 420 maintains a set of social identity images of itself (avatar) 422 and the entity's social identity image 424, during the interaction, where the images may include RSII 174, ASII 175, RTSII 176, and/or TSII 177, illustrated with reference again to FIG. 1B. Each of the images 422, 424 may have image specific attributes (e.g., SIIA 180, by way of non-limiting example) illustrated with reference again to FIG. 1C. These image's attributes may be updated each time either entity 412 or avatar 420 performs a behavior.

This situation is illustrated with reference to FIG. 4B expressed in diagram 440, which includes an interaction 444 between two avatars (e.g., avatar A 442 and avatar B 450). Each avatar 442, 450 has its own perceived identity states 446, 460. In one embodiment, avatar A 442 and avatar B 450 controlled by a single system (e.g., computing system 110) may directly access the identity attributes of the other's identity images to simplify interaction 444 complexity. In another embodiment, messages may be exchanged to directly convey identity attribute values maintained for each avatar (e.g., avatar A or avatar B). In still another embodiment, the identity attributes used within the perceived identity states of each avatar (e.g., avatar A or avatar B) and the CGSB engine 140 may be configured to calculate image attributes of the SIIA 180 based on cues (e.g., expressed paralanguage elements, by way of non-limiting example) expressed (perceived) by the avatars 114.

Regardless of how avatars (e.g., avatar A or avatar B) express image attributes to each other and/or update their own image attributes (per the identity engine 145, by way of non-limiting example) a set of social identity images (e.g., RSII and ASH) 452, 454, 462, and 464 with image attributes may be maintained for these perceived identity states 446, 460. Each time either avatar (e.g., avatar A or avatar B) performs a social action during the interaction 444, the social identity images 452, 454, 462 and 464 of both avatars (e.g., avatar A or avatar B) held by both actors may be modified as a result.

Automated entities may be configured (by computer program instructions 130) to choose actions configured to change these images in both entities to match the identity image being sought. This may imply that an IS that includes a TSII for both parties may be followed. By initializing the starting images of the TSII to be used by one or more avatars (e.g., avatar A or avatar B) with the values needed for a target application, starting attribute values or weights of the SIIA for the ASII and RSII may be used by the avatar (e.g., avatar A or avatar B) in its interaction with another entity.

In one embodiment, the LOA 165 for the behavior of the avatar 114 may be based on value shift functions for every possible LOA along each of the four social identity images (e.g., RSII, ASII, RTSII and TSII). In order to reduce setup and operation time, the computer program instructions 130 may simply associate deltas for changes in each of the attributes of the SIIA 180 for the social identity image in the identity library 166. Computer program instructions 130 may provide for further simplification by assigning these deltas to sets of like LOA 165, rather than each LOA 165 individually so long as the behaviors serve the same social function. Many CIPs may be classified this way. By way of non-limiting example, most formal greetings serve the same function and have the same social effect. Some greetings do not. Those that do, however, may receive the same delta. This may limit the number of deltas whose definitions may be required in the behavior library 164. By doing so, it permits set up of general behavior classifications that may be culturally independent (e.g., independent of specifics of culture library 162). The content of behavior or actions itself may be culturally specific (e.g., affected by specifics of culture library 162).

Establishing behaviors, emotions, and the like to sets of image attributes 180 and storing these mappings in the behavior library 164 may require a subject matter expert (e.g., behavior psychologist, by way of non-limiting example). In one embodiment, establishing data for behavior library 164 may be a result of recording human reactions in a set of situations, then adjusting parameters of the behavior library 164 to match observations.

Once a set of social identity images of the SIIM 168, states, and behavior goals have been defined, a behavior engine 146 may be configured to apply the behaviors to reach the goals. Specific cybernetic goal seeking behavior (CGSB) functionality may be implemented in CGSB engine 140. In one embodiment, the CGSB engine 140 may be configured to select the behavior with the deltas that will achieve the goal. However, interaction strategy (IS) defined in the culture library 162 often prohibit that direct approach. By way of non-limiting example, all cultures require a greeting sequence. It may be as simple as a single "hello" statement, or more complex, involving bowing and other gestures. Additionally, most cultures also require a certain amount of ancillary conversation to precede any serious business discussion. Consequently, a larger strategy may be required to navigate goal seeking even a simple conversation.

The behavior engine 146 may be configured to automate the interaction behavior to navigate a "social" environment. By way of example, the behavior engine 146 may be configured to apply identity theory to generate interaction strategies. In one embodiment, the behavior editor 143 may be configured as a modeling and editing tool for modeling behaviors of avatars 114. The behavior engine 146 may utilize the models, parameters, and settings defined by the behavior editor 143. In one embodiment, the behavior editor 143 may utilize visualizations to graphically express strategies. Use of a graphic tool for behavior editing may permit this type of editing of behavioral characteristics to be accomplished with little direct input from a software engineer. Thus, the behavior editor 143 may enable a behavioral scientist to define a cross-cultural strategy, using modeling constructs known in the field of behavioral psychology.

In one embodiment, an assumption may be made that culture specific behavioral differences may be minor, which permits behavior to be generalized for any entity or avatar 114. That is, behavioral characteristics expressed in the behavior library 164 may be generalized and cross-cultural. For situations or embodiments where cognitive processing differences between cultures may be significant due to cultural influences, culture specific behavior modifications may be accommodated.

In one embodiment, computing system 110 may utilize a framework that uses identity image deltas (changes), and theoretically defined strategies. System 110 may be considered an intelligent avatar system that may be quickly and cost effectively applied to different tasks in different cultures. That is, system 110 may eliminate the need to define a complicated interaction behavior tree (BT) structure that may be needed for conventional interaction systems that do not implement disclosed innovations. Thus, system 110 may be configured to allow the processes of the CGSB engine 140 and the identity image deltas (changes) to provide behavior selection for the avatar 114.

Figure 5:
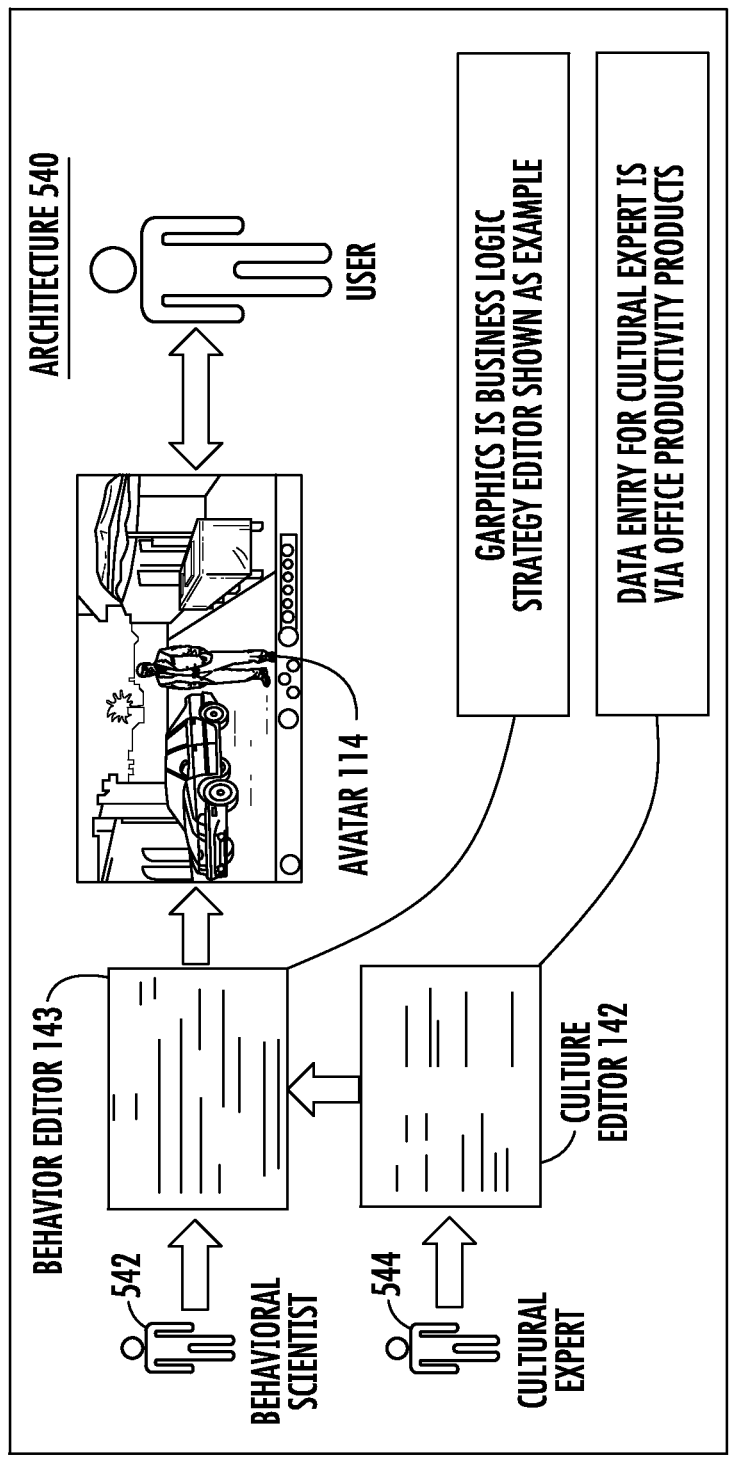
FIG. 5 illustrates intelligent avatar design and development architectures in accordance with an embodiment.

With reference now to FIG. 5, one architecture 540 herein described by way of example provides a SIIM support structure. Two independent knowledge systems may be used, one for capturing behavior strategies (stored and maintained in behavior library 164) and the other for capturing cultural data (stored and maintained in culture library 162). Each knowledge system may have its own editor (e.g., culture editor 142 and behavior editor 143), which may be graphic tools. By way of non-limiting example, the behavior editor 143 may be a tool optimized for behavioral scientist 542. The behavioral editor 143 may be configured to produce the IS that applies the identity theory. In one embodiment, the strategies may be complied and executed the behavior engine 146.

Office productivity products, such as spreadsheets, may be used to capture specific training information. Thus, the culture editor 142 may include office productivity tools/applications. Specifically, a cultural expert 544 may provide cultural information needed for contemplated social interactions in context of application 135. Cultural data and CIPs $163A^1$ ... $163A^N$ may be maintained by a database (e.g., culture library 162), which may be accessible by the behavior engine 146.

The architecture 540 may provide increased affordability and reduced development time. The modular nature of architecture 540, which separates application-specific functionality, behavior-specific functionality, and cultural-specific functionality, may ensure rapid development times, which may occur in parallel and ensures maximum software module reuse. That is, cultural elements from the culture library 162 may be re-used for a variety of applications 135 and interactions, which require culture-based distinctions. Similarly, the behavior library 164 may be reused across a vast spectrum of applications 135, which conform to an identity model framework.

Returning again to FIG. 1A, the display 128 may include a projection system. The projection system may produce life-sized characters or avatars 114, which interact with one or more users. The sensor/filter array 129 may include a microphone, camera, filters, proximity and motion sensors as well as computer peripherals (i.e. keyboard and mouse).

In an embodiment, the behavior engine 146 may include a 3D visual, 3D scene generator and simulation application. The behavior engine 146 may provide the artificial intelligence for cultural interactions of the avatar 114 and drive both the speech generation system and the avatar graphics rendering.

When a user is beyond perceptual range of the avatar, behavior engine 146 may assign the avatar a random "fidgeting" and model animations. This may allow creation of a virtual world expressing characters with variable levels of cognitive fidelity. In an embodiment, the system may support a large virtual training environment for high fidelity operation.

More specifically, in the specific illustration, the avatar 114 represents a local tribal leader who may be a point of contact for activities involving the local virtual villagers. A graphical visual database for this scenario may include 3D scene representing streets, buildings, compounds, and life forms simulating a realistic Afghanistan village environment. A behavior-dynamics graphical model rendering provides for the natural movement of the avatar 114.

As a tribal leader, this avatar 114 has goals of personal security and support from the military presence. The avatar's conversation also supports an issue regarding the killing of a goat owned by one of his villagers. Thus, the cognitive function of the avatar 114 may be configured to perform a simple negotiation on behalf of this villager.

The behavior library 164 is configured to support the avatar 114 where the LOAs may include one or more facial expressions of smiling, frowning, puzzlement, and the like. Puzzlement may provide an appropriate response when unrecognized inputs may be received. The scenario may be configured to include CIP gestures like polite bow, touching the chest, and shaking the head. Movements like turning to face the user may also be included. These may be simply a few sample paralanguage elements, graphic artist and Subject Matter Experts (SMEs) may provide additional behaviors to meet additional training needs. In an embodiment, a selected LOA 165 may be in response to a particular CIP.

The LOAs 165 for avatar 114 may include expressions of recorded sound bites of phrases, by way of non-limiting example, Pashto phrases, may be included in addition to generated speech output. Environmental sounds may be similarly added. Visual representation of behavior associated with speaking, bobbing head, moving lips and jaw, may be also coordinated with the speech processor 131, giving the avatar 114 realistic mannerisms.

In one embodiment, the system is configured to recognize the perceived behavior and respond to such perceived behavior. In one embodiment, the avatar may responds with puzzlement, a puzzled look, and an apology for not being able to understand the speaker.

The flowchart and block diagrams in the FIGS. 1A, 1B, 1C, and 2-5 illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It may also be noted that, in some alternative implementations, the functions noted in the block may occur out of the order noted in the figures. By way of non-limiting example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of various embodiments may be embodied as a system, method or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of various embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, by way of non-limiting example, but not limited to, an electronic, magnetic, optical, electromagnetic, infrared, or semiconductor system, apparatus, or device, or any suitable combination of the foregoing. More specific non-limiting examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, by way of non-limiting example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of various embodiments may be written in any combination of one or more programming languages, including an object oriented programming language such as Java, Smalltalk, C++ or the like and conventional procedural programming languages, such as the "C" programming language or similar programming languages. They may also be written in a specialized language as required by the BLI. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (by way of non-limiting example, through the Internet using an Internet Service Provider).

Aspects of various embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

That which is claimed is:

1. A computer system comprising:
   at least one tangible memory device;
   one or more processors;
   program instructions, stored in the at least one tangible memory device for execution by at least one of the one or more processors, configured to automate behavior of an automated entity to emulate social human behavior according to an interactive social identity image model (SIIM) to exhibit goal seeking behavior from the automated entity during a social interaction between the automated entity and a selected entity, and including paralanguage behavior instructions to alter paralanguage behaviors expressed for the automated entity via a user interface, based on a determined set of behavioral actions within the user interface;
   a data store including the interactive social identity image model (SIIM) for the automated entity, wherein the interactive SIIM comprises a plurality of social identity images, each social identity image having a plurality of social identity image attributes (SIIAs), and wherein at least one value of the plurality of SIIAs changes with each behavior of the automated entity and with each behavior of a selected entity during the social interaction between the automated entity and the selected entity; and
   a sensor-filter array receiving paralanguage elements of the selected entity, wherein the one of more processors determines the paralanguage elements to be employed and updates social identity images of the social identity image model of the automated entity based on the employed paralanguage elements; and
   a plurality of cultural interaction protocols (CIPs) associated with an interaction strategy, wherein the program instructions use at least one CIP to affect social interactions between the automated entity and the selected entity with which the automated entity interacts in accordance with a culturally influenced behavior exchange.

2. The computer system of claim 1, wherein the plurality of social identity images comprises:
   a reflexive social identity image (RSII) configured as a perceived social identity state of the automated entity itself;
   an actual social identity image (ASII) configured as a social identity image the automated entity has of the selected entity;
   a reflexive target social identity image (RTSII) configured as a social identity image that the automated entity wants the selected entity to have of the automated entity; and
   a target social identity image (TSII) configured as a social identity target state of the selected entity.

3. The computer system of claim 1, wherein the SIIAs comprises a list of descriptive attributes selected from the group of attributes consisting of arousal, pleasure, engagement, affect, trust, openness, competency, indebtedness, commonality, risk, relationship value, relationship density, normative control, and third person influence.

4. The computer system of claim 1,
   wherein the interaction strategy comprises a plurality of interaction strategies stored in the at least one tangible memory device, and wherein the program instructions use the interaction strategies to determine the social human behavior of the automated entity.

5. The computer system of claim 4, wherein the program instructions to automate the automated entity behavior and alter paralanguage behaviors expressed for the automated entity.

6. The computer system of claim 1, wherein the program instructions further comprise:
   social interaction instructions to determine one or more social interaction goals (SIGs) for the automated entity during the social interaction between the automated entity and the selected entity; and
   behavioral action instructions that use the plurality of social identity image attributes (SIIAs) of the interactive SIIM of the automated entity to determine a set of behavioral actions that the automated entity is to take for the determined one or more SIGs.

7. The computer system of claim 1, wherein the program instructions further comprise:
   interaction event instructions to detect an interaction event for the automated entity and the selected entity;
   update instructions to update, in response to the interaction event, the interactive SIIM of the automated entity;
   social interaction instructions to determine at least one social interaction goal (SIG) for the automated entity;

interaction strategy instructions to decide an interaction strategy for the automated entity to achieve the at least one SIG;

behavioral action instructions to determine a set of one or more behavioral actions according to the interaction strategy; and performance instructions to cause the automated entity to perform the set of behavioral actions during the social interaction within a user interface.

8. The computer system of claim 1, wherein the automated entity is an avatar and wherein the selected entity is a human.

* * * * *